(12) United States Patent
Raju (10) Patent No.: US 12,283,891 B1
(45) Date of Patent: Apr. 22, 2025

(54) SWITCHED-MODE POWER SUPPLY STARTUP CIRCUIT

(71) Applicant: Ravisekhar Nadimpalli Raju, Clifton Park, NY (US)

(72) Inventor: Ravisekhar Nadimpalli Raju, Clifton Park, NY (US)

( * ) Notice: Subject to any disclaimer, the term of this patent is extended or adjusted under 35 U.S.C. 154(b) by 0 days.

(21) Appl. No.: 18/940,539

(22) Filed: Nov. 7, 2024

(51) Int. Cl.
*H02M 3/335* (2006.01)
*H02M 3/00* (2006.01)

(52) U.S. Cl.
CPC ......... *H02M 3/33507* (2013.01); *H02M 3/01* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 5/2573; H02M 1/081; H02M 5/293; H02M 7/12; H02M 3/10; H02M 3/125; H02M 3/13; H02M 3/135; H02M 3/145; H02M 3/15; H02M 3/156; H02M 3/157; H02M 3/158; H02M 1/346; H02M 3/1588; H02M 2003/1566; H02M 3/1584; H02M 2003/1557; H02M 1/0032; H02M 1/4225; H02M 7/217; H02M 1/0025; H02M 1/0045; H02M 1/0009; H02M 1/088; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265;
(Continued)

(56) References Cited

U.S. PATENT DOCUMENTS

6,573,674 B1 * 6/2003 Rivet ................. H05B 39/02
318/431
9,354,643 B2 * 5/2016 Harel ................. H05B 45/10
(Continued)

*Primary Examiner* — Jeffrey A Gblende (57) ABSTRACT

A system to deliver auxiliary or startup current at a low voltage side from a higher voltage input side is provided which comprises a SIDAC or voltage-breakover switch and an inductor to transfer energy from the high voltage input side to the low voltage side. The system further comprises capacitors at the high voltage input and low voltage sides. The SIDAC or voltage-breakover switch turns on when the voltage across it exceeds a specific value and initiates a current pulse through the inductor for transferring energy from the high voltage input side capacitor to the low voltage side. The voltage breakover rating of the SIDAC or voltage-breakover switch is selected to be in between the voltage levels of the high voltage input side and the low voltage side.

10 Claims, 10 Drawing Sheets

(58) Field of Classification Search
CPC ....... G05F 3/267; G05F 1/575; H05B 39/048; B23K 11/24; H04B 2215/069
See application file for complete search history.

(56) References Cited

U.S. PATENT DOCUMENTS

9,531,255 B2 * 12/2016 Chen .................. H02M 3/33546
10,158,300 B2 * 12/2018 Newman, Jr. .......... H05B 45/37

* cited by examiner

Prior Art

Fig. 1

Prior Art

Fig. 2A

Prior Art

SWITCHED-MODE POWER SUPPLY STARTUP CIRCUIT

BACKGROUND

Switched-mode power converters are used in a wide range of applications such as AC-DC supplies for computers and phone chargers, solar inverters, motor drives, and electric vehicle propulsion and charging equipment.

These switched-mode power converters internally use one or more integrated circuits (ICs) to provide functions such as pulse-width modulation for controlling the converter switches and regulating the output. Often these control ICs require a small amount of startup current at a low voltage (e.g., a few microamps or milliamps and 10-20 volts) to power up and to initiate operation of the switching circuit. The startup current is typically derived through a resistive branch from the high voltage input which, for example, can be about 100-400 volts for low power consumer electronics or 400-2000 volts for electric vehicles and utility-scale solar inverters. There are many applications such as mains-powered sensors where a small amount of power in the milliwatt or a few watts range is needed at a low voltage (e.g. less than 50 V) and needs to be derived from a substantially higher voltage in the hundreds of volts.

Example circuits in the prior art for deriving a small amount of current for startup or auxiliary power are described in the application note 'Applications for depletion MOSFETs', AN-1807-PL11-1809-121428, Edition 2018 Jul. 20, published by Infineon Technologies AG and the application note 'High Density Auxiliary Power Supply Using a SiC MOSFET for 800-V Traction Inverters', SLU-AAL3-July 2022, published by Texas Instruments Incorporated. A disadvantage of techniques used in the prior art to derive the startup current is that either they result in substantial power losses that continue during normal operation after the startup is complete or they require additional switches and gating to disconnect the startup current path for reduced power losses during normal operation.

Therefore, what is needed are techniques that overcome the above mentioned disadvantage.

BRIEF SUMMARY OF THE INVENTION

Embodiments of the invention provide a means to derive low voltage from a higher voltage input using a SIDAC (silicon diode for alternating current), a capacitor, and an inductor. As an example, the derived low voltage can be in an approximate range of 5-48 volts DC while the voltage input can be in the range of 100-2000 volts. The derived low voltage can be used to feed an electronic load or feed the startup supply current required by the internal control IC(s) of a switched-mode power converter.

In accordance with one aspect of the invention, a first capacitor is charged through a resistor from the input/source voltage of a power converter system. The said first capacitor is connected through a SIDAC and an inductor to a second capacitor that is connected across the power supply rails (i.e., across Vcc and ground/negative rail) of a control IC in the power converter system or to a load. The SIDAC turns on when its breakover voltage is reached and energy from the said first capacitor is transferred through the said inductor to the said second capacitor in a substantially lossless or resonant manner. The said control IC or the said load is fed by the voltage across the said second capacitor. An optional freewheeling diode provides a path for the current in the said inductor to ramp down when the said first capacitor has discharged to a substantially zero voltage. The SIDAC turns off when its current drops below the holding current and the said first capacitor recharges through the said resistor from the input/source voltage to repeat the cycle as described above.

In accordance with another aspect of the invention, a first capacitor, a SIDAC, an inductor, and a second capacitor are placed in a series path across the input/source terminals of a power converter system. The second capacitor is connected across the power supply rails (i.e., across Vcc and ground/negative rail) of a control IC in the power converter system. When the input/source voltage across the said power converter system ramps up, the SIDAC turns on when its breakover voltage is reached. This initiates a resonant charging of the said first and second capacitors through the said inductor. A freewheeling diode is used to clamp the voltage across the first capacitor to the input/source voltage and transfer the energy stored in the inductor to the said second capacitor. A control IC in the power converter system is fed its supply voltage and current requirement from the said second capacitor. As the input/source voltage ramps up, the SIDAC turns on whenever its breakdown voltage is reached setting up one or more resonant cycles to charge the second capacitor for supplying the startup current needs of the said control IC.

Various other features and advantages will be made apparent from the following detailed description and the drawings.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide an understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention.

Figure 1:
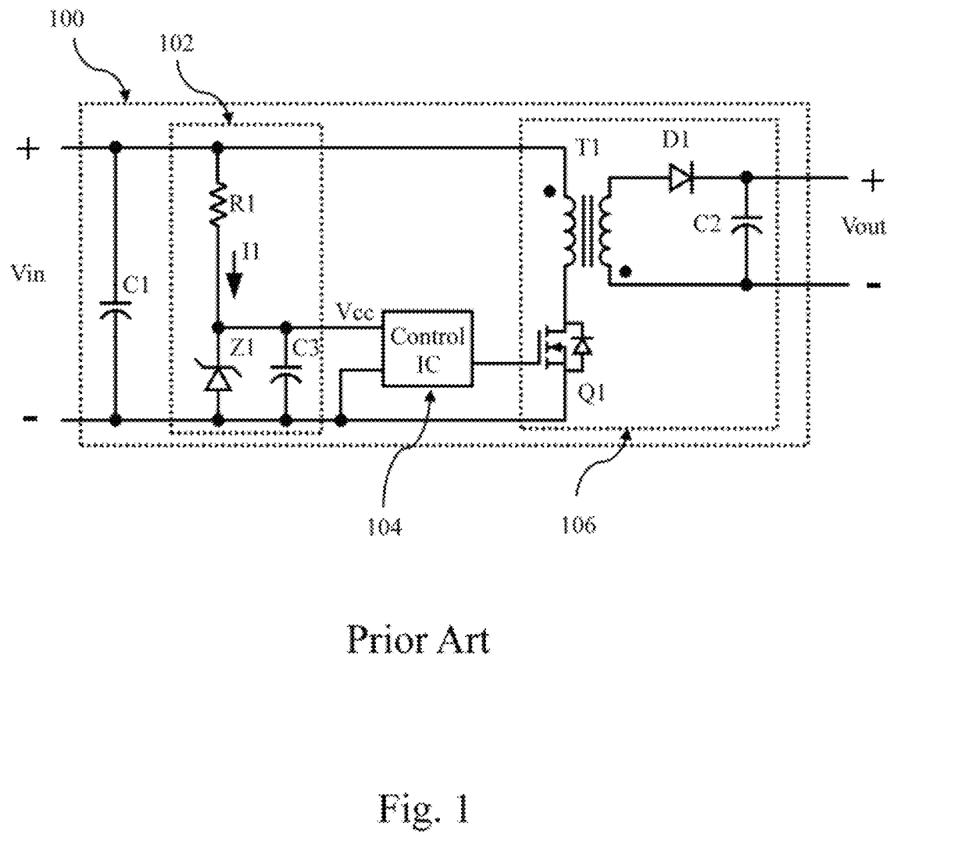
FIG. 1 illustrates a method to derive power for startup and operation of the control IC(s) in a switched-mode power converter from the input bus according to prior art.

FIG. 1 illustrates a switched-mode power converter system, 100, according to prior art. The power converter uses a flyback topology circuit, 106, to convert an input voltage Vin to an output voltage Vout. Transistor Q1 is turned on to build up current in the magnetizing inductance of transformer T1. When Q1 is turned off, the energy in the magnetizing inductance of T1 is transferred to the output through the secondary winding of T1 and diode D1. Capacitors C1 and C2 provide buffering at the input and output sides. Control of the duty cycle of Q1 by changing the proportion of on and off times is used to regulate the output voltage. Typically a control IC, 104, is used to perform this function as well as other functions such as protective shutdown in case of overloads or overvoltages. In FIG. 1, the power required to operate the control IC, 104, is derived through the circuit portion 102 comprising resistor R1, capacitor C3 and an optional zener diode Z1. The zener diode is often integrated within the control IC. The afore-mentioned components in the circuit 102 are selected such that a current I1 is drawn from the input bus for feeding the control IC and establishing its required supply voltage Vcc. Typically the current needed by the control IC to startup and continue operation ranges from a fraction of a milliamp to a few milliamps.

Hence resistor R1 is generally quite large in value ranging from a few kiloohms to megaohms. Although the power needed by the control IC is typically small, the overall power consumed by the circuit 102 can be quite large. For instance if the control IC consumes 0.1 W at 20 V, i.e, draws a current of 5 mA, and if the converter input voltage Vin is 500 V, the overall power drawn by circuit 102 is 500 V×5 mA, i.e, 2.5 W. This power is wasted primarily as heat in resistor R1. This leads to degraded efficiency of the converter system 100, as well as the need for extra cooling or use of a physically larger component for resistor R1 to handle the heat. Converter 100 may fall short of efficiency levels set in regulatory requirements which mandate power supplies to have low losses when they are in an idling or unloaded mode.

Figure 2A:
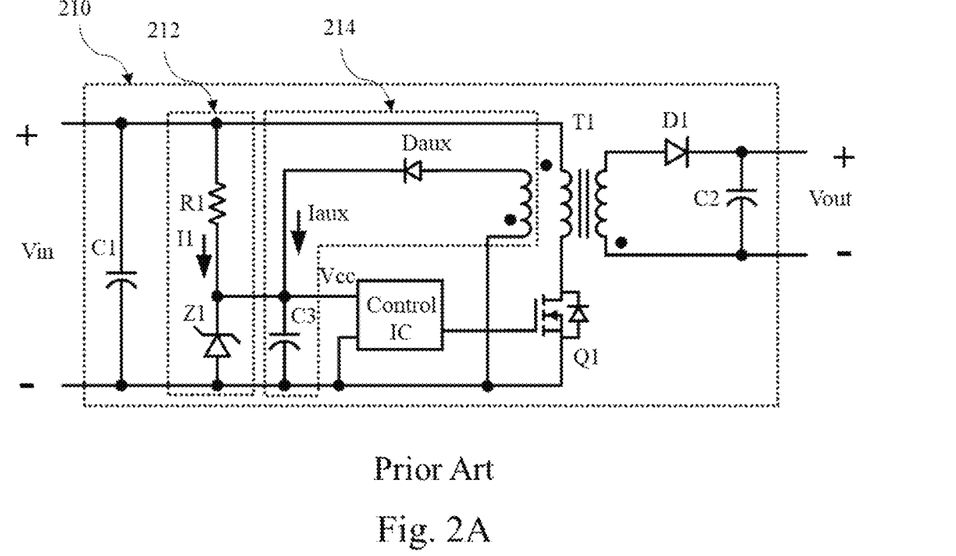
FIG. 2A illustrates a method, according to prior art, wherein the power for the control IC(s) is derived from the input bus during startup and also provided from a transformer auxiliary winding when the switching power converter is in normal action.

FIG. 2A illustrates a switched-mode power converter system, 210, according to prior art, with improved efficiency compared to the system in FIG. 1. In this case, the circuit portion 212 provides the initial startup current needed by the control IC. Once the control IC is up and functioning, Q1 starts switching and the circuit portion 214 comprising an auxiliary winding in transformer T1 and an auxiliary side Daux provides the input operating current needed by the control IC at its Vcc pin. Typically the control IC requires sub-mA currents for startup and a few mA during subsequent continuous operation. With the circuit portion 212 designed to feed a current that only needs to match or exceed the startup current required by the control IC, power losses are reduced and hence the overall efficiency of converter system 210 is improved compared to that in FIG. 1.

Figure 2B:
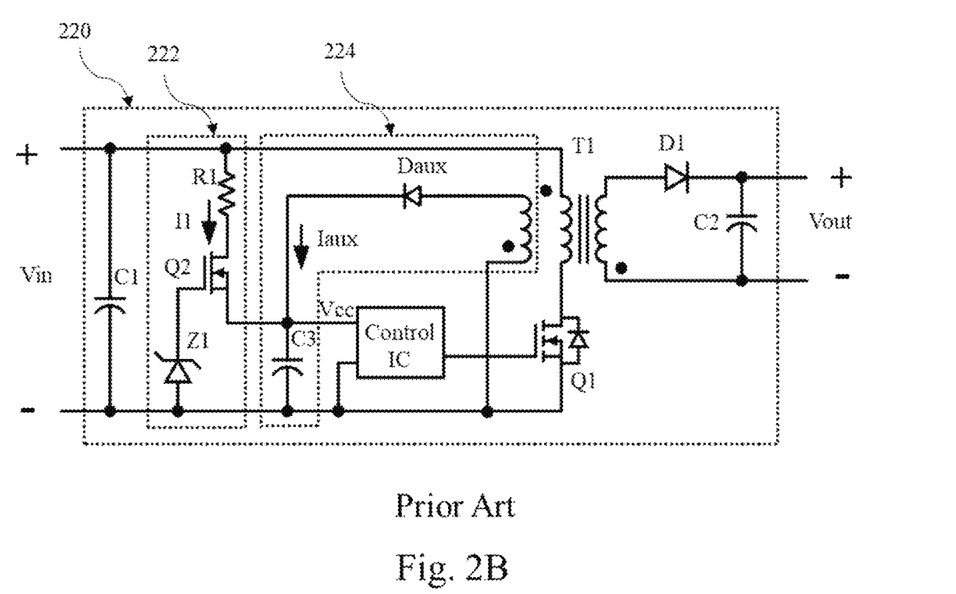
FIG. 2B illustrates a method, according to prior art, wherein the circuit branch deriving power for the control IC(s) from the input bus during startup is switched off when the control IC(s) has received sufficient supply voltage to start operating. The power needed by the control IC(s) is then derived from a transformer auxiliary winding with the switching power converter in operation.

FIG. 2B illustrates a switched-mode power converter system, 220, according to prior art, with further improvement in efficiency compared to the system in FIG. 2A. In this case, a depletion mode MOSFET Q2 is added in series with the resistor R1 in the circuit portion 222 used for the startup current. The depletion mode MOSFET Q2 is ON when its gate voltage is zero, as is the case prior to the system power-up. Hence during startup a current I1 flows through R1 to capacitor C3 and the Vcc supply power pin of the control IC. When Vcc sufficiently exceeds the Zener Z1 voltage, Q2 turns off and the current I1 becomes substantially zero. With Vcc having risen sufficiently and with capacitor C3 providing an energy buffer for the startup, the control IC can start operating. Subsequent power needed at the control ICs input pin Vcc is provided by the auxiliary circuit portion 224. In this case, the circuit portion 222 is engaged only during the startup and disengaged during subsequent operation of converter system 220. Thus circuit portion 222 incurs power losses only during startup and substantially no power losses during regular operation of the converter system, and hence the overall efficiency of converter system 220 is improved compared to that of the converter system 210 in FIG. 2A.

Figure 3:
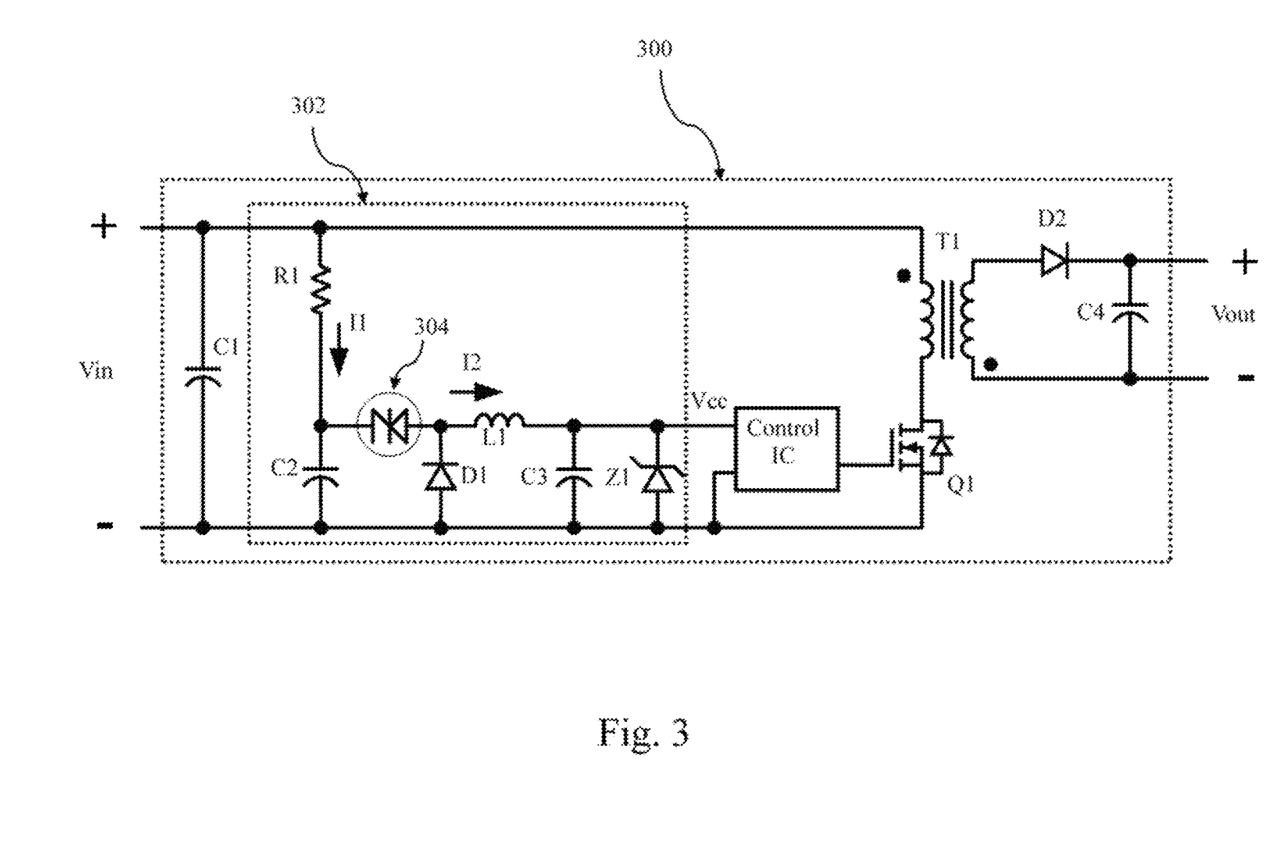
FIG. 3 illustrates a circuit, according to an embodiment of the present invention, wherein an RC branch is connected across the input side DC bus of the switching power converter and wherein the energy accumulated in the capacitor of the RC branch is periodically transferred through a SIDAC and an inductor to power the supply pins of the control IC during startup and subsequent operation.

FIG. 3 shows a power converter system, 300, comprising a startup circuit, 302, according to an embodiment of the present invention. The startup circuit comprises an RC branch across the input bus with resistor R1 as a path to charge capacitor C2. It further comprises a SIDAC, 304, and an inductor, L1, that are connected between the junction of the afore-mentioned RC branch and the supply pin, Vcc, of the control IC used in converter system 300. The SIDAC is selected to have a breakdown voltage level that is in between the converter system input voltage, Vin, and the control IC supply voltage, Vcc. For instance, if Vin has a range of 100-1000 V, and the control IC needs a supply voltage Vcc in a range of 15-20 V, selecting a SIDAC with a breakover voltage of 100 V results in the SIDAC first breaking over during startup when the voltage across C2 reaches 100 V. Current I2 flows through the inductor L1 into capacitor C3 connected across the Vcc and ground pins of the control IC. When the voltage across C2 substantially reaches zero, the current I2 diverts through D1 and continues to charge capacitor C3 until substantially all the energy in inductor L1 is transferred to capacitor C3 and current I2 subsides to zero. The current through the SIDAC goes below the holding current of the SIDAC during this process and hence the SIDAC turns off, and a new cycle is established with capacitor C2 charging up through resistor R1 until the SIDAC breakover voltage is again reached. This cycle repeats itself to charge capacitor C3 and raise and maintain the Vcc pin of the control IC at its required voltage. An optional zener diode Z1 acts as a voltage clamp for Vcc and provides overvoltage protection. The functionality of Z1 can be optionally integrated within the control IC. Inductor L1 in this and subsequent embodiments can be substituted by a resistor or by a combination of a resistor and an inductor.

Figure 4:
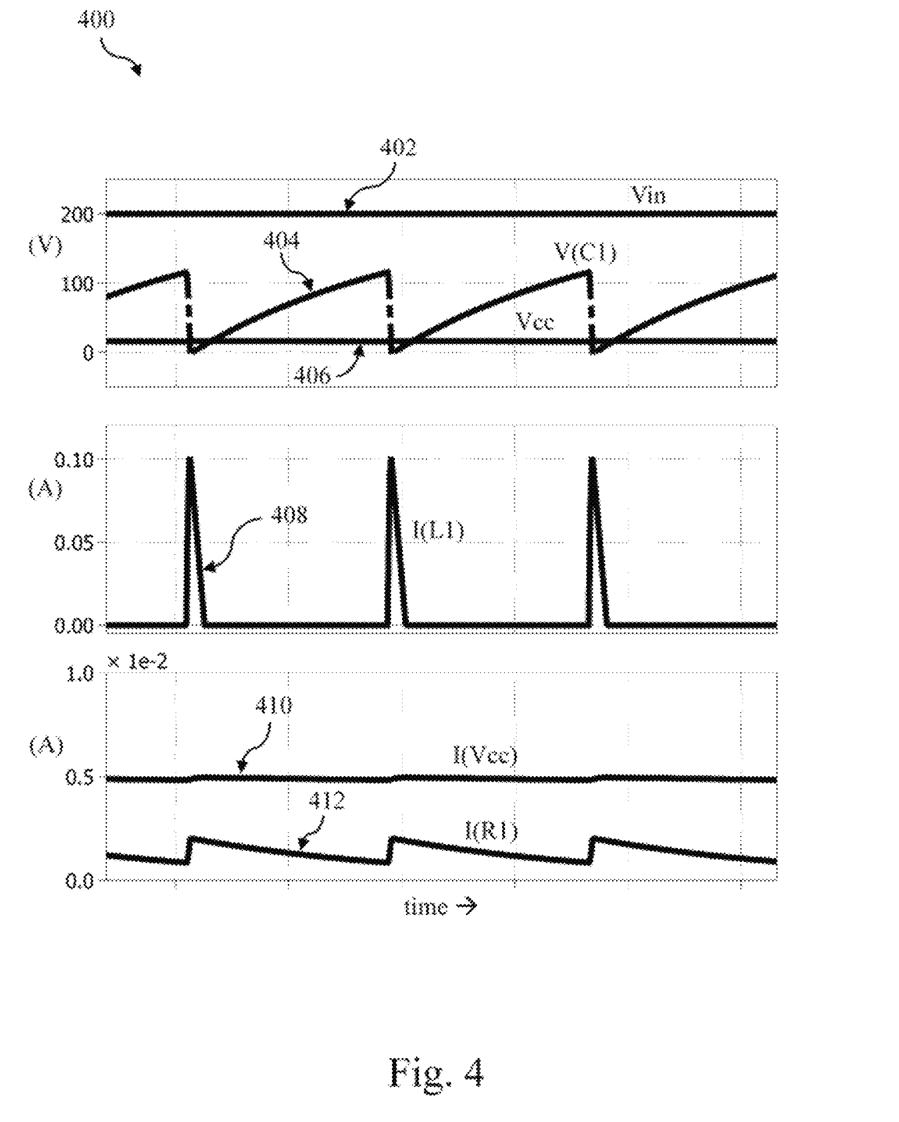
FIG. 4 illustrates selected voltage and current waveforms for the portion of the circuit in FIG. 3 that provides power for the control IC.

FIG. 4 shows example operating waveforms, 400, for the circuit section 302 shown in FIG. 3. An input voltage of 200 V is used as indicated by waveform 402. A SIDAC (304) with a breakover voltage of 100 V is used. The voltages across capacitors C2 and C3 of FIG. 3 are represented by waveform 404 and 406 respectively. When the voltage across the SIDAC exceeds its breakover voltage, it discharges C2 through inductor L1 and charges C3. The pulses of current in the inductor L1 during this process are shown in waveform 408. Waveform 410 indicates the supply current drawn by the control chip and waveform 412 indicates the current drawn from the input bus through resistor R1. The current 412 drawn from the input bus is substantially lower than the supply current 410 fed to the control IC. This lower current draw from the input bus reduces losses and improves efficiency. In contrast the prior art system shown in FIG. 1 would draw a current from the input bus that matches or exceeds the supply current needed by the control IC.

Figure 5:
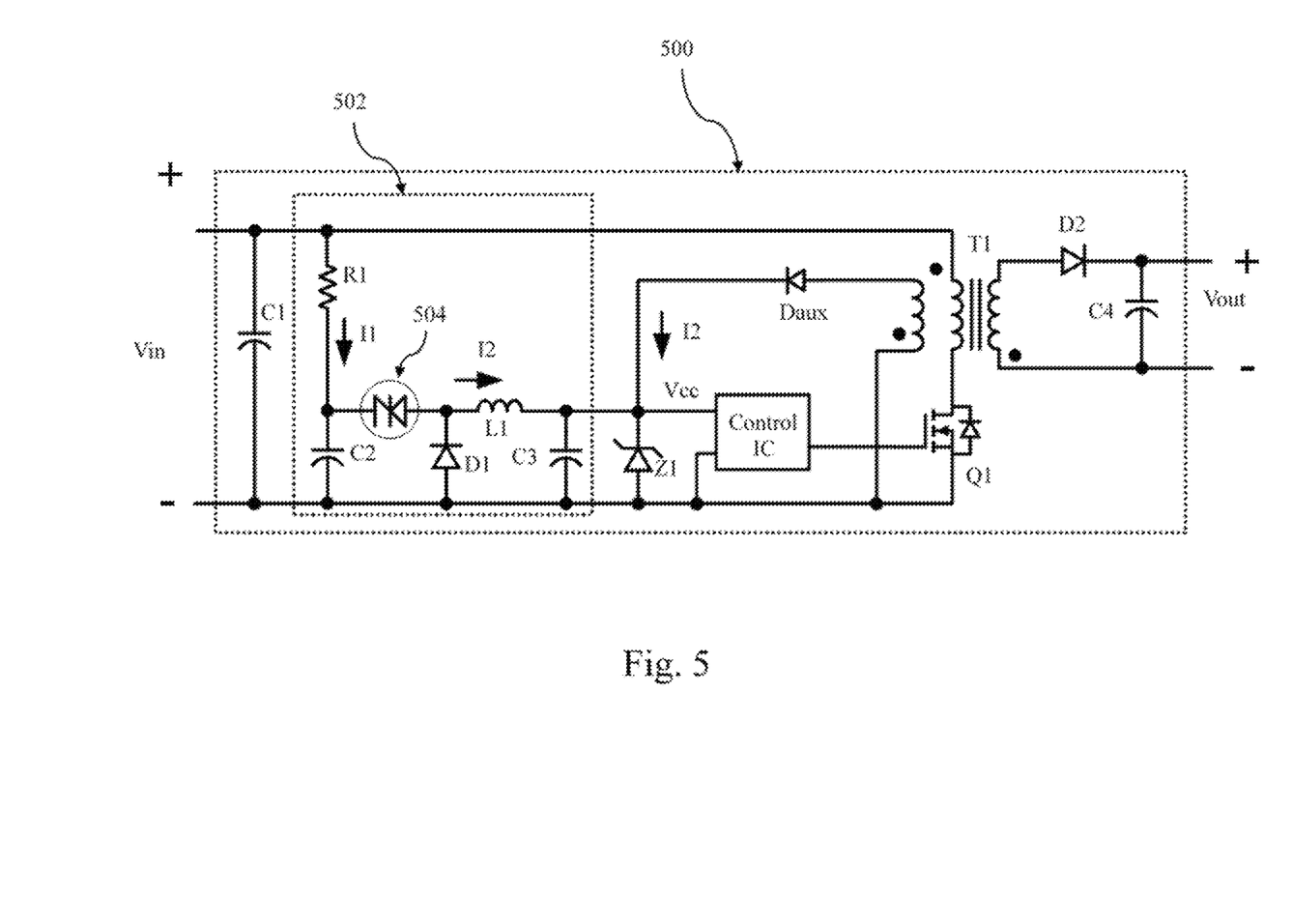
FIG. 5 illustrates a circuit, according to an embodiment of the present invention, which is identical to the circuit in FIG. 3 with the exception that an auxiliary winding with a diode is added to supply current to the control IC when the switching power supply is operating.

FIG. 5 shows a power converter system, 500, comprising a startup circuit, 502, according to yet another embodiment of the present invention. The startup circuit in this embodiment functions in a similar manner to the circuit 302 in FIG. 3. However in contrast to the system in FIG. 3, circuit 502 is sized to only supply a current to the control IC that is sufficient for its startup. After the startup phase, when switching action ensues in the power converter, an auxiliary winding in transformer T1 supplies the operating current needed at the Vcc pin of the control IC through diode Daux. Typically the startup current needed by the control IC would be lower than its operating current requirement. Hence the steady-state losses in resistor R1 in the circuit 502 can be reduced compared to that in the FIG. 3 embodiment.

Figure 6:
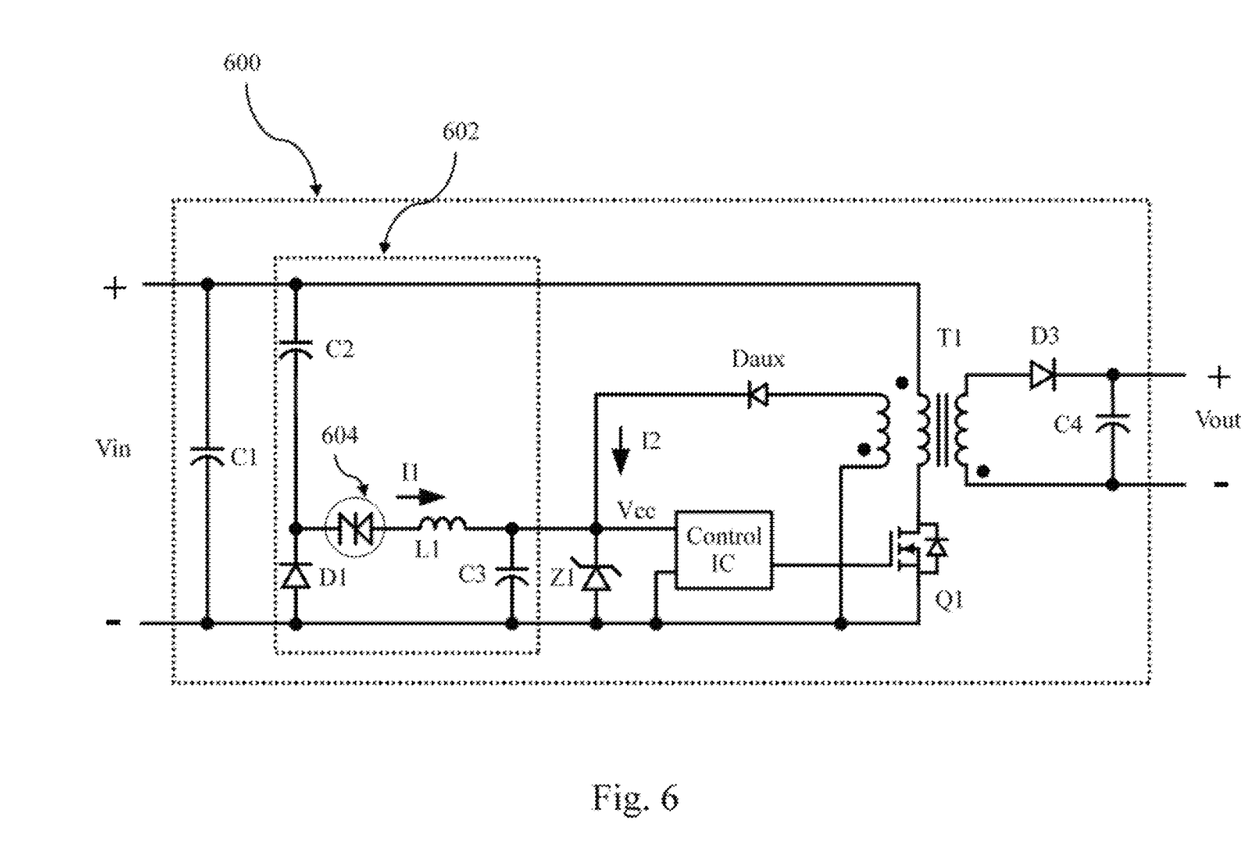
FIG. 6 illustrates a circuit, according to an embodiment of the present invention, wherein a path comprising a first capacitor, a SIDAC, a freewheeling diode, an inductor, and a second capacitor is placed across the input DC bus of a switching converter. During startup, the SIDAC breaks over to initiate charging of the said second capacitor, and the second capacitor feeds input power needed by the control IC for startup. During subsequent operation of the switching converter, the control IC is fed from an auxiliary winding and current flow through the startup branch substantially ceases.

FIG. 6 shows a power converter system, 600, with a startup circuit, 602, according to yet another embodiment of the present invention. The startup circuit in this embodiment comprises a capacitor (C2), a SIDAC (604), an inductor (L1), a second capacitor (C3) and a freewheeling diode (D1). When a source is connected to the input terminals of the converter system 600, the voltage Vin across C1 rises. Capacitors C2 and C3 are at substantially zero voltage at the beginning of the startup. The SIDAC 604 turns on when Vin exceeds its breakover voltage and a current flows from the input bus through C2, SIDAC 604, L1 and C3. A substantially piece-wise sinusoidal resonant current pulse flows charging up C2 and C3. When the voltage across C2 reaches Vin, it is clamped substantially at Vin by diode D1, and the energy remaining in inductor L1 is substantially transferred to C3 with a current flow through the freewheeling path comprising diode D1 and SIDAC 604 until the current reaches substantially the holding current of SIDAC 604 at which point the SIDAC turns off. During ramp up of Vin to its steady state value, the SIDAC is turned on when its breakover voltage is exceeded resulting in one or more current (I1) pulses and capacitor C3 is charged up to a level where the control IC pin Vcc has sufficient voltage to start operation of the control IC. Subsequently, the Vcc pin can be supplied from an auxiliary winding in transformer T1 through diode Daux.

Figure 7:
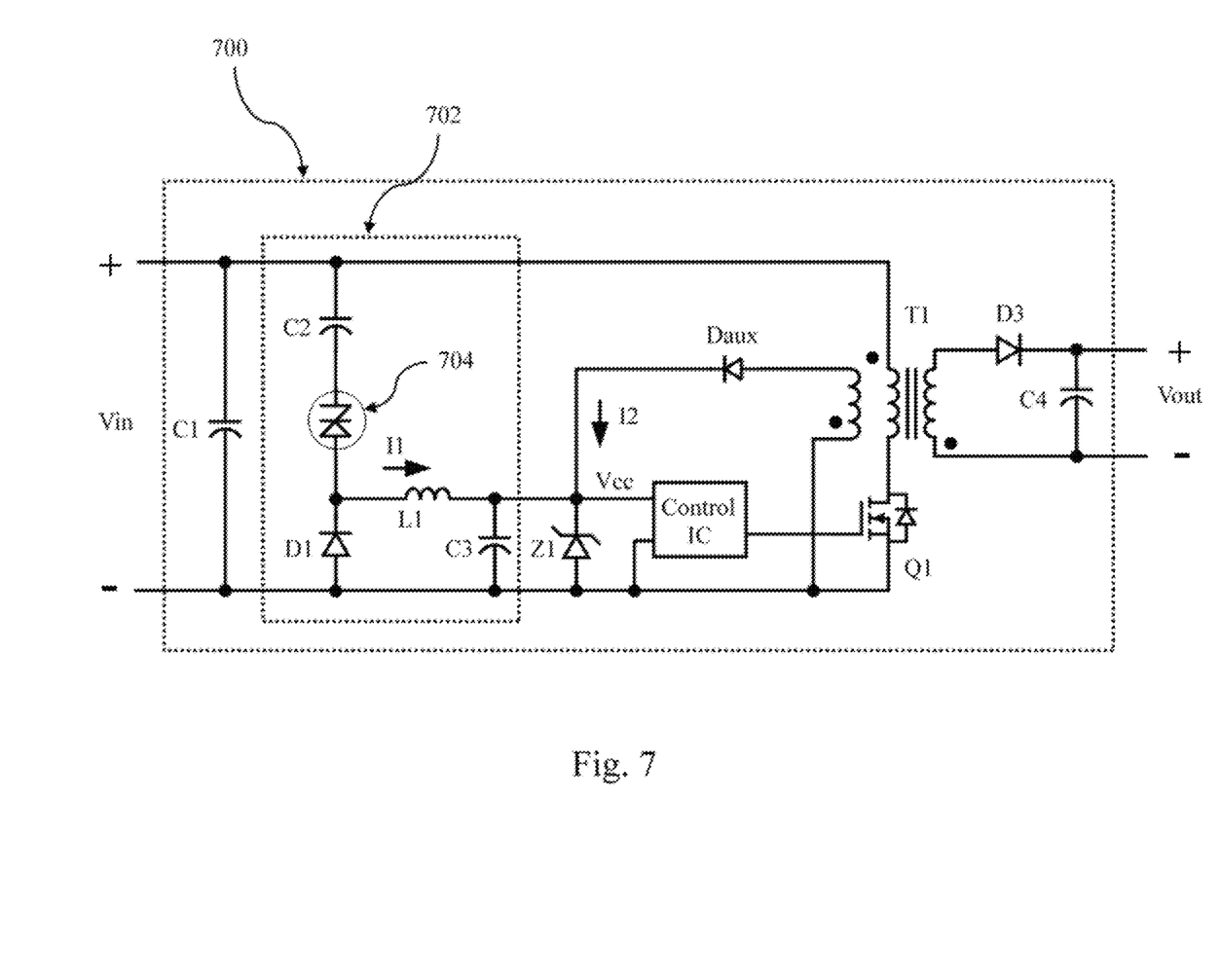
FIG. 7 illustrates, according to an embodiment of the present invention, a circuit that is substantially similar in structure and in operation to the circuit in FIG. 5, with the exception of the placement of the SIDAC in the startup charging path.

FIG. 7 shows a power converter system, 700, with a startup circuit, 702, according to yet another embodiment of the present invention. The startup circuit in this embodiment comprises a capacitor (C2), a SIDAC (704), an inductor (L1), a second capacitor (C3) and a freewheeling diode (D1). This structure is similar to the embodiment in FIG. 6 with the exception that SIDAC 704 is moved to be directly in series with the capacitor C2 unlike the location used for SIDAC 604. The functioning of the startup circuit 702 is substantially similar to that of the startup circuit 602.

Figure 8:
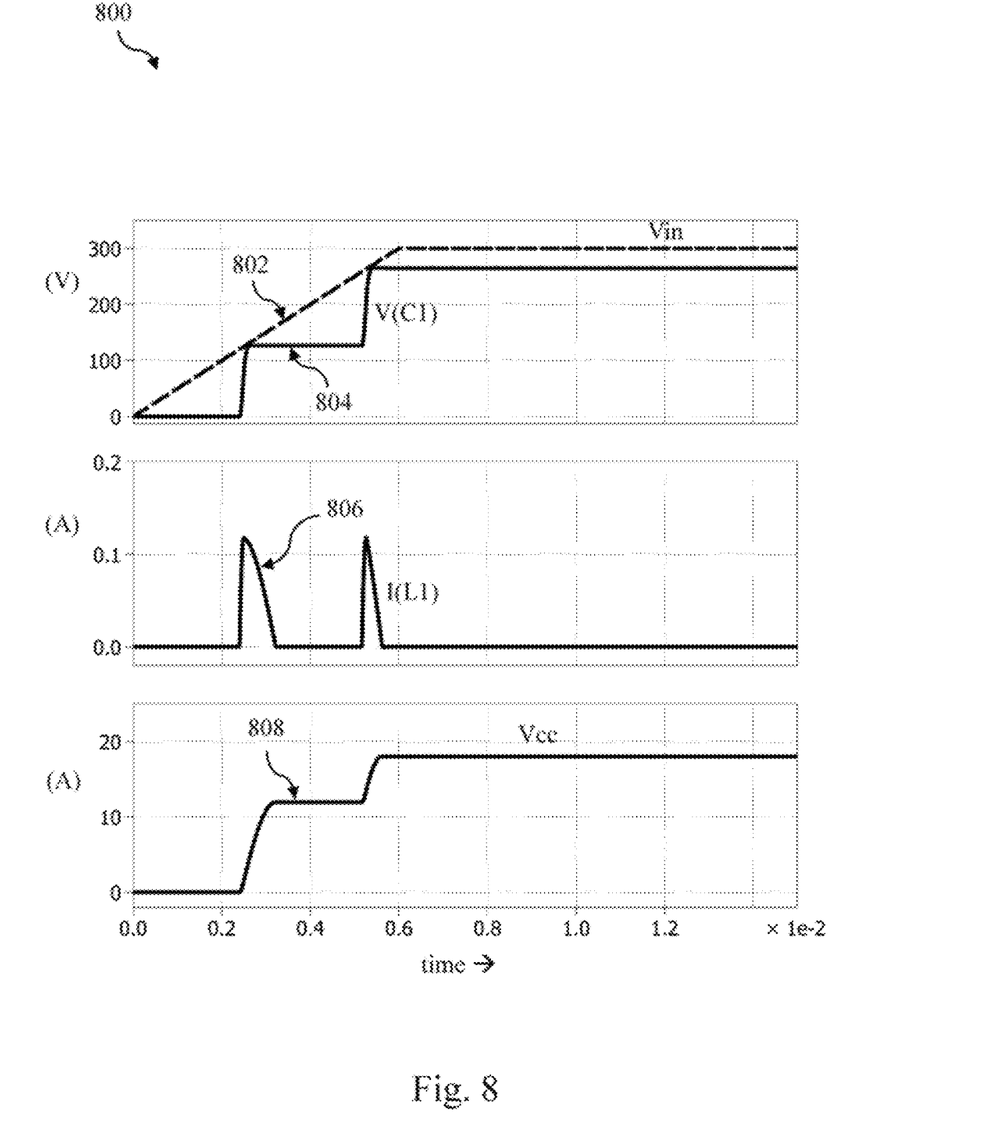
FIG. 8 illustrates selected voltage and current waveforms for the portion of the circuit in FIG. 6 that provides power for the control IC.

FIG. 8 shows example startup waveforms, 800, for the circuit section 702 shown in FIG. 7. An input voltage ramp up from 0 V to 300 V is used as indicated by waveform 802. A SIDAC (704) with a breakover voltage of 120 V is used. The voltages across capacitors C2 and C3 of FIG. 7 are represented by waveform 804 and 808 respectively. When the voltage across the SIDAC exceeds its breakover voltage, it charges up C2 and C3 through inductor L1. The pulses of current in the inductor L1 during this process are shown in waveform 806.

Figure 9:
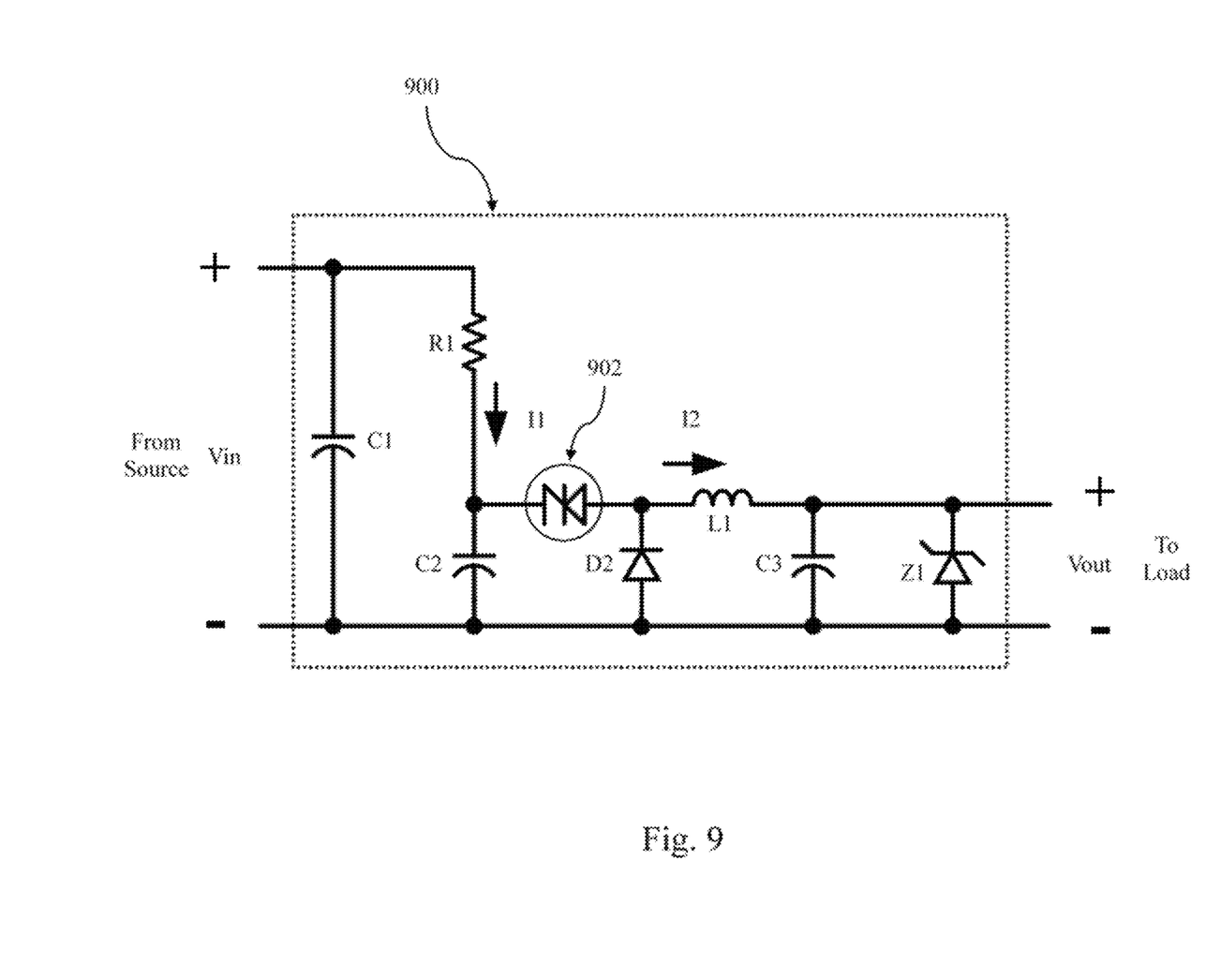
FIG. 9 illustrates, according to an embodiment of the present invention, a circuit comprising a resistor and a capacitor across an input voltage and comprising a SIDAC and an inductor to draw power from the said capacitor and deliver it at a stepped down voltage to a load.

FIG. 9 illustrates, according to another embodiment of the present invention, a power converter system 900 that steps down input voltage Vin to an output voltage Vout for provision to a load. SIDAC 902 turns on when the voltage across it exceeds its breakover voltage and initiates a resonant current pulse through inductor L1 to charge capacitor C3 from capacitor C2. Capacitor C2 is then recharged from the source through resistor R1 to repeat the process.

Figure 10:
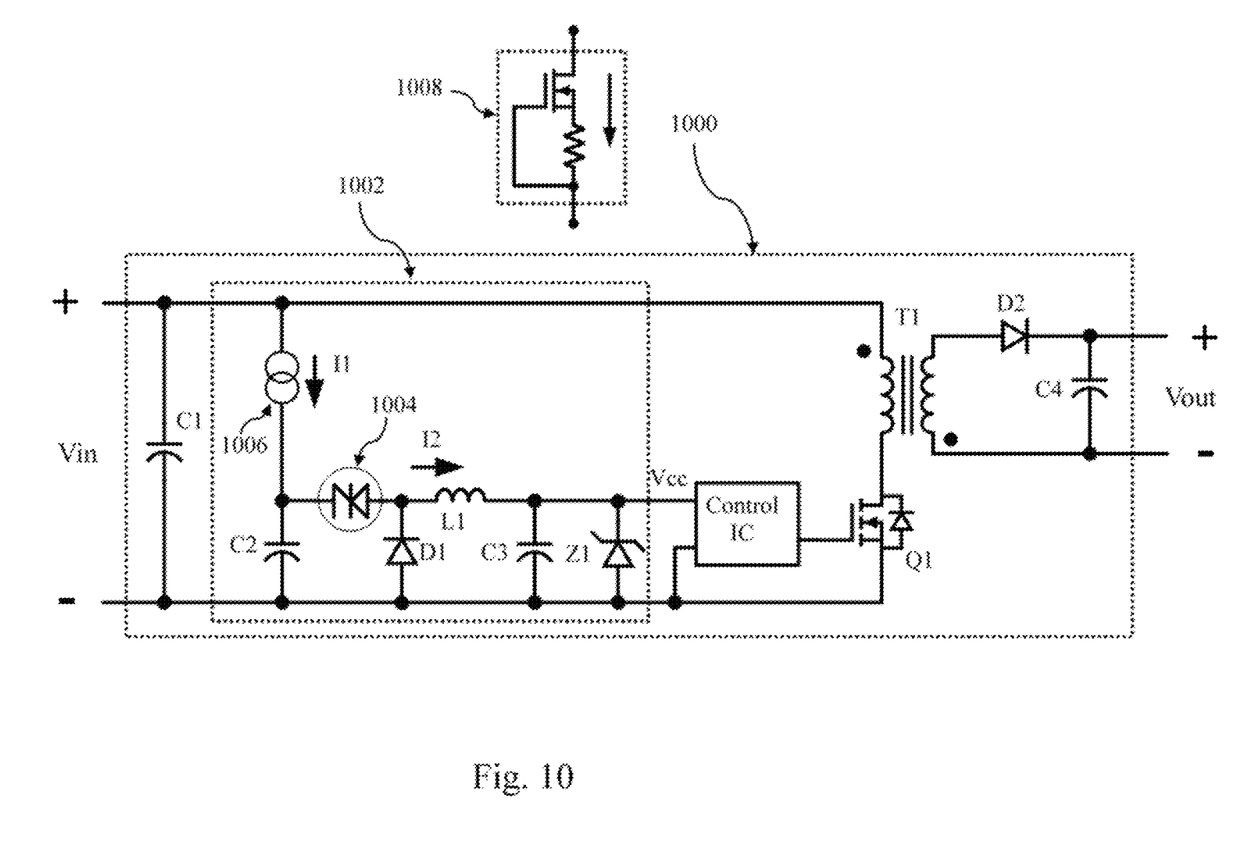
FIG. 10 illustrates, according to an embodiment of the present invention, a power converter system that is topologically identical to that in FIG. 3, with the exception that the resistor on the input side is substituted by a current sink.

FIG. 10 illustrates, according to another embodiment of the present invention, a power converter system 1000 that is topologically identical to the power converter system 300 in FIG. 3, with the exception of resistor R1 being replaced by a current sink 1006. One method of realizing the current sink 1006 is shown in 1008 that uses a depletion mode MOSFET and a resistor. In contrast to the circuit in FIG. 3 where resistor R1 will draw increased current at higher input voltages, the current sink in FIG. 10 will draw a substantially fixed current and hence result in improved efficiency of the power converter system 1000.

In the foregoing embodiments, a unidirectional SIDAC symbol has been used in the figures. In other embodiments of the invention, the unidirectional SIDAC, shown in the figures can be replaced by a bidirectional SIDAC. In yet other embodiments, it can be replaced by a DIAC (diode for alternating current). In yet other embodiments, it can be replaced by a semiconductor switch controlled by a DIAC. In yet other embodiments, it can be replaced by a combination comprising a SIDAC and a diode. In yet other embodiments, it can be replaced by a switch comprising a semiconductor with the switch breaking over when the voltage across it is at a value that is in between the input voltage of the converter system and the required supply voltage of a control IC used in the converter system. The resistor used in the foregoing embodiments can be substituted by a current source or a non-linear/temperature-dependent resistor.

The foregoing description of exemplary embodiments of the invention has been presented for the purposes of illustration and description. It is not intended to be exhaustive or to limit the invention to the precise forms disclosed. It will be recognized by those skilled in the art that many modifications and variations are possible without departing from the essential scope of the invention. It is, therefore, to be understood that the scope of the invention is not limited to the particular embodiments disclosed, and that the invention will include all embodiments falling within the scope of the claims appended hereto.

What is claimed is:

1. A power supply circuit comprising:
an input side connecting to a source voltage;
an output side supplying power to a control integrated circuit or a load;
a resistor and a first capacitor connected in series across the input side;
a second capacitor connected across the output side; and
a voltage-triggered switch connecting, via an inductor, the first capacitor to the second capacitor;
wherein the voltage-triggered switch has a breakover voltage level that is in between the input side source voltage and a voltage required by the control integrated circuit or the load at the output side; and
wherein the voltage-triggered switch, when subject to a voltage equaling or exceeding the breakover voltage level, turns on and transfers energy from the first capacitor to the second capacitor via the inductor.

2. The power supply circuit of claim 1:
wherein the voltage-triggered switch comprises a SIDAC.

3. The power supply circuit of claim 1:
wherein the voltage-triggered switch comprises a DIAC.

4. The power supply circuit of claim 1:
wherein the resistor is substituted by a current sink.

5. A power supply circuit comprising:
an input side connecting to a source voltage;
an output side supplying power to a control integrated circuit or a load;
a first capacitor and a freewheeling diode connected in series across the input side;
a second capacitor connected across the output side; and
a voltage-triggered switch and an inductor placed in series and providing a connection from a junction of the first capacitor and the freewheeling diode to the second capacitor;
wherein the voltage-triggered switch has a breakover voltage level that is less than the input side source voltage; and
wherein the voltage-triggered switch, when subject to a voltage equaling or exceeding the breakover voltage level, turns on and transfers energy from the input side to the second capacitor via the inductor.

6. The power supply circuit of claim 5:
wherein the voltage-triggered switch comprises a SIDAC.

7. The power supply circuit of claim 5:
wherein the voltage-triggered switch comprises a DIAC.

8. A power supply circuit comprising:
an input side connecting to a source voltage;
an output side supplying power to a control integrated circuit or a load;
a first capacitor, a voltage-triggered switch, and a freewheeling diode connected in series across the input side;
a second capacitor connected across the output side; and
an inductor with a first end connected to the voltage-triggered switch and the freewheeling diode and a second end connected to the second capacitor;
wherein the voltage-triggered switch has a breakover voltage level that is less than the input side source voltage; and
wherein the voltage-triggered switch, when subject to a voltage equaling or exceeding the breakover voltage level, turns on and transfers energy from the input side to the second capacitor via the said inductor.

9. The power supply circuit of claim 8:
wherein the voltage-triggered switch comprises a SIDAC.

10. The power supply circuit of claim 8:
wherein the voltage-triggered switch comprises a DIAC.

* * * * *